Aug. 21, 1951  G. F. LINCKS  2,564,701
CIRCUIT OPENING DEVICE
Filed July 31, 1948  2 Sheets-Sheet 2
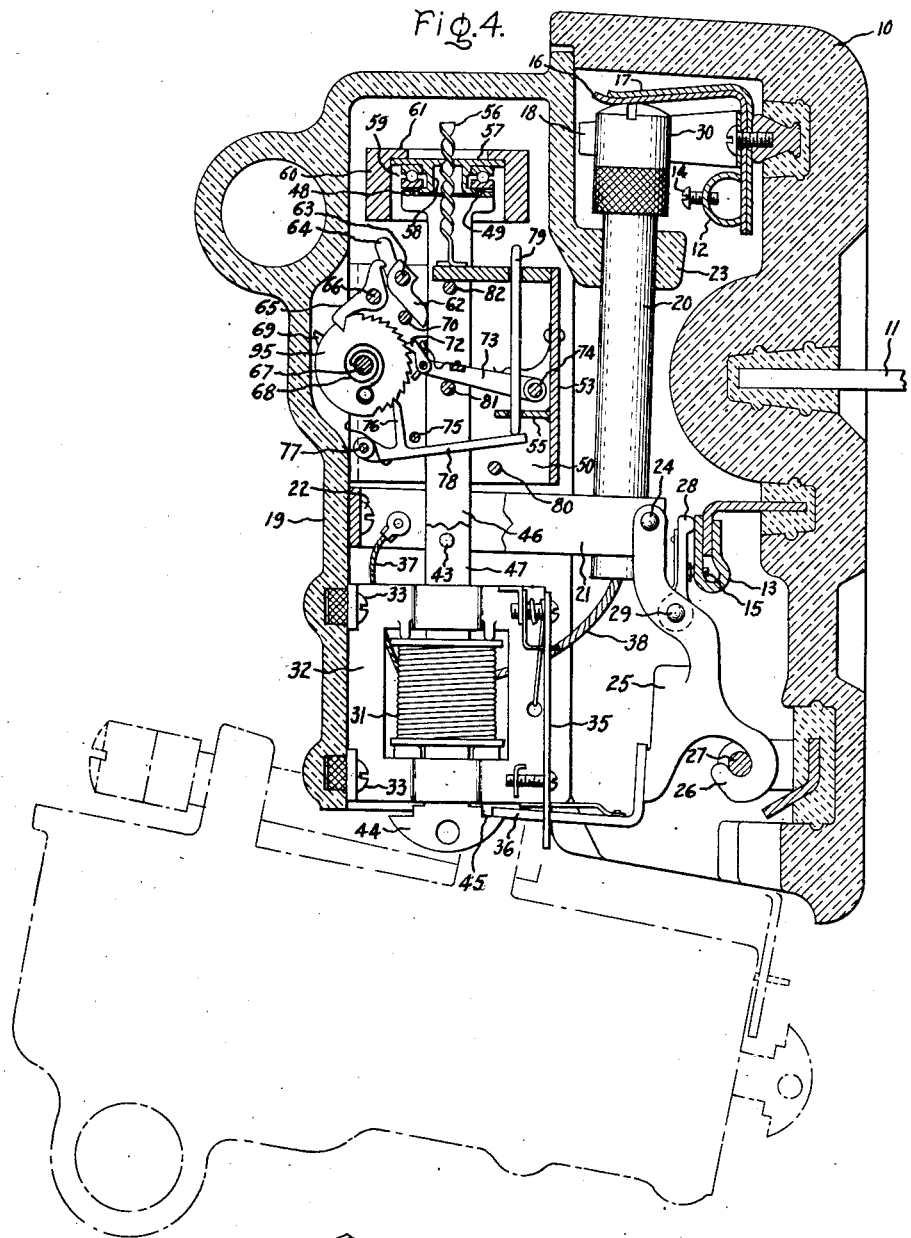
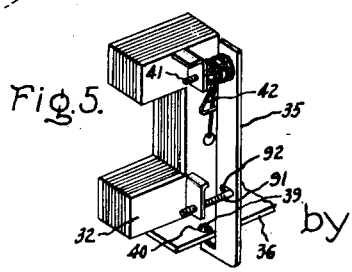
Inventor:
George F. Lincks,
by Ernest C. Britton
His Attorney.

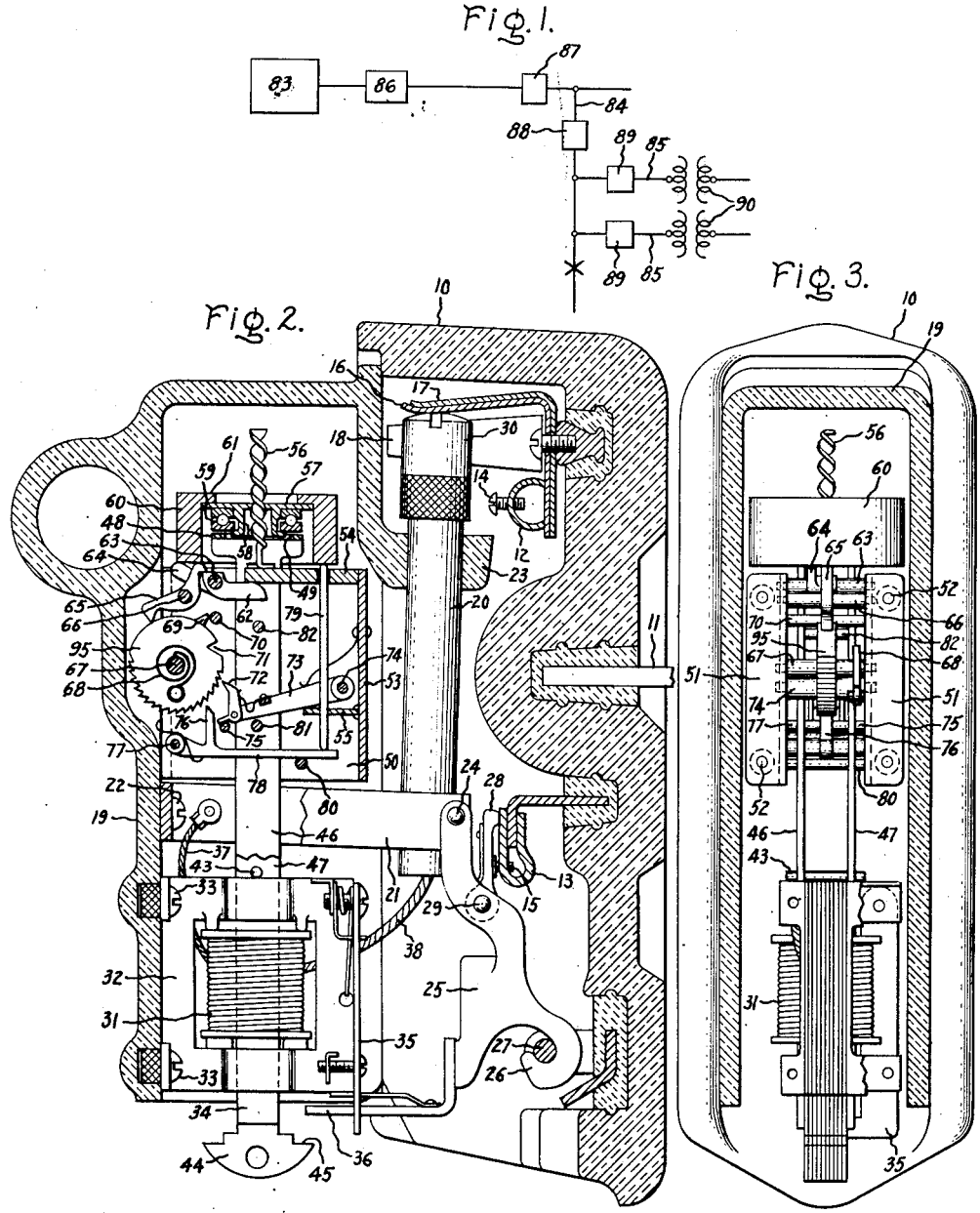

Patented Aug. 21, 1951

2,564,701

UNITED STATES PATENT OFFICE 2,564,701

CIRCUIT OPENING DEVICE

George F. Lincks, Pittsfield, Mass., assignor to General Electric Company, a corporation of New York Application July 31, 1948, Serial No. 41,791

3 Claims. (Cl. 200—108)

My invention relates to a new and improved circuit opening device and more particularly to an automatic circuit opening or sectionalizing device for electric power distribution systems in which my device is used in connection with an automatically-operated reclosing circuit breaker.

In such distribution systems, when a permanent heavy current fault or short circuit occurs on a branch circuit, it is desirable to isolate that particular branch from the system and permit service to be continued on the remainder of the system which has been unaffected. To partially carry out this function, sectionalizing apparatus which allows the faulty section to drop out after the feeder main has been energized by overcurrent through an automatic reclosing breaker a given number of times are currently employed by a few power companies. However, as pointed out in my copending application, Serial Number 788,567, filed November 28, 1947, and assigned to the same assignee as this application, such devices are expensive and, therefore, have been employed only on a very few circuits and then only on some of the most important branches connected directly to the main feeder.

There is an ever increasing demand for cheaper devices to carry out this function to economically permit their employment in all branches of such power distribution systems.

It is, therefore, an object of my invention to provide a simple and relatively inexpensive circuit disconnecting device, any number of which may be employed in conjunction with a single reclosing circuit breaker to isolate any faulted or overloaded circuit from the remaining portion of the distribution system in a new and novel manner.

It is another object of my invention to provide a circuit opening device which will be conditioned for operation by a fault current but those contacts will be held in engagement thereafter until the fault current has been interrupted by another device connected in series relationship therewith.

Although the contacts therein are held in engagement after the device has been conditioned for operation, it is still another object of my invention to provide a device in which the normal contact holding means is rendered completely ineffective and is in no way relied upon for the purpose of holding the contact in engagement once the device is conditioned.

It is a further object of my invention to provide a circuit disconnecting device which will be responsive to successive fault current impulses above a predetermined value, but will not be conditioned for or disconnect the circuit in which it is installed until after the occurrence of a predetermined number of such successive fault impulses.

It is still a further object of my invention to provide a circuit opening device in which a predetermined number of successive fault current impulses will be effective to remove a blocking means which normally prevents the conditioning of the device for disconnection.

In addition, it is an object of my invention to provide a simple fly-wheel time delay means which will hold the counting means of disconnecting device from resetting to its normal set position while the fly-wheel is displaced from a normal at rest position.

It is also an object of my invention to provide a simple and compact circuit opening device which may be used in connection with prior art holders for fuse cutouts.

In this application, I do not broadly claim a circuit opening device which will be conditioned for operation by a fault current and whose contacts will be held in engagement thereafter until the fault current has been interrupted by another device connected in series relationship therewith, nor a device which will be responsive to successive fault current impulses above a predetermined value, but will not disconnect the circuit until after the occurrence of a predetermined number of such successive fault impulses, such inventions being respectively covered broadly by pending application of Lincks and Smith, Serial No. 761,893, filed July 18, 1947, and pending application of Lincks, Serial No. 788,567, filed November 28, 1947, each of which are assigned to the same assignee as this application. The broad aspects of any features disclosed in said applications and common to the instant application are to be regarded as prior art with respect to this present application which is directed to a circuit opening device in which a predetermined number of successive fault current impulses will be effective to remove a conditioning blocking means by a particular and distinguishing combination of elements and in a particular manner not disclosed in such prior art applications.

In accordance with my invention, I provide an improved circuit opening device in which the circuit completing contacts are normally held in engagement by a releasable latching means, the release of which is prevented by a releasable blocking means which is released by a counting mechanism in response to successive fault current impulses above a predetermined value through a current responsive means upon a predetermined one of the successive impulses subsequent to which the latching means is released by the current responsive means upon the occurrence of the next fault current impulse which then holds the contacts in engagement as long as the fault current continues, but subsequently permits disengagement of the contacts upon interruption of the fault current by another device in the circuit.

My invention will be better understood from the following description when taken in connection with the accompanying drawings, and the scope of my invention will be pointed out in the appended claims. In the drawings, Fig. 1 is a schematic diagram illustrating a small section of a distribution system employing sectionalizer opening devices embodying my invention; Fig. 2 is a side elevation view, partly in section, of my improved opening device in the normal closed circuit position; Fig. 3 is a front view of the device shown in Fig. 2 with the cover or door cut away; Fig. 4 is a sectional view similar to Fig. 2, still in the closed circuit position but after a fault current has caused the device to be conditioned for opening; and Fig. 5 is a detail view in perspective of the elements which, when released, condition the device for opening.

Referring now to Figs. 2 and 3 of the drawing, I have illustrated by invention in connection with a housing 10 of porcelain or similar insulating material of the size and shape used for fuse cutouts of the prior art, such as is disclosed, for example, in United States Letters Patent 2,081,813, assigned to the same assignee as the present application. To the rear of the housing or casing 10 is secured a mounting bar 11 for the attachment of the casing to an electric line pole and cross-arm structure or the like. Conductors which are brought into the housing through holes in the housing side wall are adapted to be connected to contacts 12 and 13 by means of binding screws 14 and 15, respectively. Upper contact 12 has a contact finger 16 backed up by means of a spring strip 17 which serves to press or bias the finger 16 downwardly and has also a pair of spaced resilient contact latching fingers 18, only one of which can be seen in the drawing.

A movable door or cover 19, preferably constructed of insulating material, is provided for housing 10 and suitably supports a contact support tube 20 and my circuit opening elements to be described hereinafter. Door support bracket 21 is formed by bending a metallic bar of conducting material at two points equidistant from the midpoint of its predetermined length to form, in plan, an open-sided isosceles trapezoid, the open side of which is closed by welding or otherwise suitable fixing the two free ends of the trapezoid to a metallic circular cylindrical tube having a length equal to the width of the bars as views in the drawing, and an inside diameter slightly larger than the outside diameter of the contact support tube. This bracket, which is not shown in Fig. 3 in the interest of simplicity, is rigidly fixed to the door by means of screws 22. Contact support tube 20 is made of insulating material and is mounted on the cover adjacent its upper end by means of projection 23 of insulating material formed integrally with the cover and provided with an opening for accommodating the tube. The tube is supported adjacent its lower end by insertion into the cylindrical part of the door support bracket, and is rigidly held therein by pivot pin 24 which engages an opening in the cylinder and passes through a groove in the wall of the tube perpendicular to its axis.

A metal lever 25 of conducting material supports cover 19 and is bifurcated at its upper end to form a fork, only one arm of which is visible in the drawing. The arms of the fork are pivotally connected to the cylindrical part of the door support bracket by means of pin 24. Lever 25 is provided at its lower end with a hook portion 26 which passes over a pivotal pin 27 secured in housing 10. Lever 25, prior to the final open circuit position, is electrically connected to the lower contact terminal 13 by means of a contact finger 28 which is pivotally connected between the forks of lever 25 at 29. Contact finger 28 is biased in a clockwise direction to provide the desired contact pressure and also to urge cover 19 and its connected parts to the open position.

Contact cap 30 is threadedly mounted on the upper end of contact support tube 20 and when the door is closed, as shown in the figures, this cap passes between the resilient contact latching fingers 18 and engages contact finger 16, all of which are connected to upper contact terminal 12.

The circuit opening elements of my circuit opening device consist of an electromagnet 31 mounted on its frame 32 which is, in turn, rigidly mounted on cover 19 by means of screws 33, an armature 34, a first latch member 35 and a second latch member or arm 36 rigidly fixed to and projecting from hooked-shaped lever 25. One end of the electromagnet winding is electrically connected by flexible conductor 37 to cover support bracket 21, while the other end of the winding is connected to contact cap 30 by flexible conductor 38 which passes up through the contact support tube 20 and is electrically connected by solder or other suitable means to a button head. The button head, of the type conventionally employed for fuse links, is fixed in good conducting relationship between the top of the fuse tube and the contact cap when the cap has been screwed down tight on the tube threads. Thus, the electromagnet is electrically connected in series relationship with terminals 12 and 13 by way of contact finger 16, contact cap 30, conductor 38, conductor 37, cover support bracket 21, pivot pin 24, forked arms of lever 25, pivot pin 29 and contact finger 28.

From an inspection of the drawing, it is obvious that the device as a whole, exclusive of the housing, is pivotally mounted on pin 27 and constitutes a toggle mechanism, one arm of which consists of hooked-shaped lever 25 and the other arm consists of cover support bracket 21, door 19 and the various elements hereinbefore described and mounted thereon. These two arms are inter-connected at the knee of the toggle by pin 24. When in the condition shown by Fig. 2, the toggle mechanism is in rigid position with movable contact cap 30 and contact finger 28 in electrical engagement with terminals 12 and 13, respectively. Although these contacts are obviously held in engagement by latching fingers 18, they are also and otherwise held in engagement and the toggle maintained in rigid position by the engagement of a projection 39 on latch 35 with an aperture 40 in the second latch or projecting arm 36 of the hooked-shaped lever 25, as better illustrated by Fig. 5. Latch 35 is pivotally mounted at 41 on the frame 32 of the electromagnet and is biased by spring 42 in a counterclockwise direction, as viewed in Fig. 5. However, the biasing actions of contact 16 on contact cap 30 and contact finger 28 urge projecting arm 36 in a counterclockwise direction, as viewed in Fig. 2, about pivot pin 27 to maintain the latch and projecting arm in engagement. The winding of the electromagnet is wound on a spool, the inside diameter of which is sufficient to accommodate armature 34 for axial movement therein. Armature 34 is prevented from falling by gravity out of the magnet by the engagement of a suitable screw or pin 43 thereon with the magnet frame, as better illustrated in Fig. 3, and is provided at the lower end with an enlarged head 44 containing a ledge or lip 45 thereon. Since the door assembly is mounted on hinge pin 27, it is obviously also movable manually into and out of the position shown in Fig. 2 for disconnecting purposes. The device, as thus far described, is identical to one of the circuit opening devices described in copending application of Lincks and Smith, Serial No. 761,893, filed July 18, 1947, and assigned to the same assignee as this application.

However, in accordance with the present invention, armature 34 is provided with an integral portion extending upwardly between the spaced arms of cover bracket 21 and comprising two parallel spaced bars 46 and 47, each of which is spread out at their upper ends and integrally joined by a plate 48 having a circular opening 49 in the center thereof. In addition, there is provided a support bracket comprising a pair of parallel and spaced plates 50, only one of which is visible in Figs. 2 and 4, each having a leg portion 51 extending at right angles thereto to permit rigid mounting of the plates on the inner face of the door 19 by means of screws, not shown, through holes 52 in the legs. The opposite vertical edges of the plates 50 are interconnected or joined by a plate 53. Relatively narrow plates 54 and 55 are rigidly mounted on plate 53, by welding or any other suitable means, and project normally therefrom toward armature bars 46 and 47, plate 54 extending therebetween. Rigidly fixed to plate 54 is a spiral or screw 56 projecting vertically and upwardly therefrom between the armature bars and through opening 49 in plate 48. Mounted for rotational and axial motion on screw 56 is a circular friction plate 57 having a rectangular opening in the center thereof to accommodate the screw and a hollow hub section 58 integral therewith and projecting downwardly therefrom to accommodate a thrust bearing 59. The upper race ring of thrust bearing 59 is pressed on the outer surface of hub 58 for rotation therewith, while the lower race ring of the thrust bearing is merely retained loosely in position by a flange projecting outwardly from the lower portion of the hub and having a maximum diameter less than the diameter of the opening 49 in plate 48. A flywheel 60 having an inside diameter slightly greater than the outside diameter of friction plate 57 is supported thereon by means of a flange 61 integral with and projecting inwardly from the upper rim of the flywheel.

A block or stop lever 62 is pivotally mounted between spaced plates 50 and is biased by gravity for clockwise rotation from the blocking position shown in Fig. 2 on its pivot pin 63. Integral with block lever 62 is a projecting arm 64 having a rounded end which is engaged by the lower rim of flywheel 60 when in the position illustrated in Fig. 2. When in this position, it will be apparent that the flywheel will be effective to maintain block lever 62 in the blocking position shown. However, block lever 62 is normally held in this position, independent of flywheel 60, by the engagement of the hooked-shaped end of block releasing and holding latch 65 with block lever 62, as illustrated in Fig. 2. Block releasing and holding latch 65 is pivotally mounted between plates 50 and is biased for by gravity counterclockwise rotation on its pivot pin 66. However, counterclockwise rotation of latch 65 beyond the position indicated in Fig. 2 is normally prevented by the engagement of a V-shaped projection, on the end of latch 65 opposite the hooked-shaped end, with the smooth periphery portion of a circular notching disc 95. Notching disc 95 is pivotally mounted between spaced plates 50 for rotation on its pivot pin 67 and is biased in a clockwise direction by spring 68. Clockwise rotation beyond the position indicated in Fig. 2 is prevented by engagement of a projection 69 on the side thereof with a pin 70 fixed between spaced plates 50. Pin 70 serves also as a stop to limit clockwise rotation of block lever 62 after release. In addition to the smooth portion, a number of ratchet teeth and a relatively deep V-shaped notch 71 are also provided in the circular periphery of notching disc 95. A notching pawl 72 is pivotally mounted for rotation on lever 73 and is spring biased counterclockwise for engagement with the ratchet teeth on notching disc 95. Lever 73 is in turn pivotally mounted at 74 between plates 50 and is also spring biased for counterclockwise rotation. However, counterclockwise rotation of lever 73 beyond the position indicated in Fig. 2 is prevented by engagement with projection 55 and engagement of pawl 72 with the ratchet teeth is prevented by the engagement of an integral projection on pawl 72 with a pin 75 mounted between plates 50. A notching disc holding and reset pawl 76 is pivotally mounted between plates 50 on pivot pin 77 and is biased counterclockwise for engagement with the ratchet teeth on disc 95. Reset pawl 76 is provided with an integral arm 78 extending between armature bars 46 and 47 and is engaged at the outer end thereof by an elongated vertical pin 79 slidably mounted in openings in projecting plates 54 and 55. When in the position shown in Figs. 2 and 3, the engagement of the lower rim of flywheel 60 with the upper end of vertical pin 79 effectively holds reset pawl 76 out of engagement with the ratchet teeth on disc 95 against the biasing action of the spring, urging the pawl into engagement. Clockwise rotation of pawl 76, due to the weight of flywheel 60, beyond that indicated in Fig. 2 is prevented by the engagement of arm 78 with a pin 80 fixed between spaced plates 50. In addition to pin 43, two additional pins 81 and 82 are fixedly mounted on armature bars 46 and 47 and their purpose will be apparent from the description of operation to follow.

Referring now to Fig. 1, I have schematically illustrated in a one-line diagram a portion of a power distribution system comprising a substation 83 supplying current to a main branch 84 and a plurality of sub-branches 85 through a conventional automatic reclosing circuit breaker or multi-shot fuse cutout 86 located in the main circuit near the substation and through my sectionalizer devices 87 also located in the main circuit at an advantageous point between recloser 86 and the point of connection of the main branch to the main circuit, 88 located in the main branch close to the main circuit and 89 located in each of the sub-branches feeding transformers 90.

Under normal current conditions, the tube 20, the door 19 and all the elements hereinbefore described and mounted thereon will be held as illustrated in Fig. 2 so the contact cap 30 is in contact with terminal contact 16 and thus with terminal 12 by the engagement of latch 35 with latch or projecting arm 36 on hook-shaped member 25. Upon the occurrence of a fault, for example at X, on the main branch 84 above a predetermined value concerning which the circuit opening device 87 and 88 and recloser 86 are designed to be responsive, the electromagnet 31 in my circuit opening devices 87 and 88 will be sufficiently energized to attract armature 34 upwardly so that lip 45 thereon will approach the free end of projecting arm 36 with which it is aligned. However, actual engagement between these two elements is prevented by the engagement of pin 82 fixed between armature bars 46 and 47 with blocking lever 62 which arrests further upwards movement of the armature. Since pin 81 is fixed on the armature bars 46 and 47, it also raises therewith to engage lever 73 and turn it clockwise about its pivot and thereby move pawl 72 pivotally mounted thereon away from its stop 75 for counterclockwise rotation under its spring bias into engagement with the ratchet teeth on notching disc 95. Thereupon, disc 95 is rotated slightly counterclockwise against its spring bias.

Simultaneously, thrust bearing 59, friction plate 57 and flywheel 60 will be raised by plate 48 mounted on the upper end of the armature bars. The movement of the friction plate 57 is axial and obviously rotational about spiral screw 56, but since this upward movement of the armature is relatively fast, and inasmuch as flywheel 60 has considerable resisting inertia, its movement will be mostly axial or vertical with a slight amount, if any, of rotational motion.

Promptly following the first impulse of current above a predetermined value, automatic recloser 86 will interrupt the circuit and since electromagnet 31 will thereby be de-energized, armature 34 and plate 48 mounted on the end of the armature bars will drop rapidly while flywheel 60, friction plate 57 and thrust bearing 59, fixed to the hub thereof, will follow relatively slowly because of the rotational inertia of the flywheel. Downward movement of pin 81 with the armature will simultaneously permit counterclockwise rotation of lever 73 under its spring bias and effect disengagement of pawl 72 from the ratchet teeth on disc 95. Nevertheless, notching disc 95 will be maintained in the position to which it has been rotated by the prior engagement of reset pawl 76 with the ratchet teeth, inasmuch as flywheel 60 is only effective to hold pawl 76 out of engagement when at the normal at rest position shown in Fig. 2. Thereafter, recloser 86 closes the circuit and if the fault X is still thereon, armature 31 in opening devices 87 and 88 will again be attracted to effect further counterclockwise rotation of notching disc 95, as hereinbefore described. The design of these opening devices is so coordinated with the design of the recloser that the time delay means comprising the flywheel 60 and elements directly associated therewith do not have an opportunity to return to its normal at rest position between an interruption and a subsequent reclosing of the circuit by the recloser. In this way, the notching disc 95 in circuit opening devices 87 and 88 will be advanced in a step-by-step manner by successive impulses of current above a predetermined value until eventually relatively deep notch 71 in the disc of circuit opening device 88 will have been rotated counterclockwise to such a position that the V-shaped end of block holding and releasing latch 65 will drop therein, thereby effecting counterclockwise rotation of this latch and disengagement of its opposite and hooked-shaped end from stop or block 62. When the recloser 86 subsequently interrupts the circuit, pin 82 will drop with the armature and block 62 will then be free to turn clockwise on its pivot out of the path of movement of the armature and pin 82. Then, upon the next closing of the circuit by recloser 86, the armature and pin 82 will move to its full extreme upper position shown in Fig. 4 and thereby permit engagement of lip 45 with the end of latch or projecting arm 36 to raise it sufficiently to disengage the aperture 40 therein from projection 39 whereupon latch 35 is released for counterclockwise rotation under the biasing action of spring 42. Actually, the upward movement of projection 36 is a slight clockwise motion of the arm and toggle 25 about the hinge pin 27 which at the same time results in and is permitted by a slight additional upward movement of the entire cover assembly. The counterclockwise travel of latch 35 is limited by a screw or pin 91 mounted on the magnet frame and passing through a slot 92 in the latch as viewed best in Fig. 5. The relationship between this pin and slots is such that in its extreme released position the projection 39 on the latch is completely out from under the arm 36 so that downward or counterclockwise motion of the arm about pin 27 will no longer be prevented by latch 35. However, the toggle mechanism is nevertheless prevented from collapsing and the contacts are held in engagement not by latch 35 but by the lip or ledge 45 on the head 44 of the armature continuing to engage the end of the arm 36 and thereby acting directly as a latch until such time as the recloser again interrupts the circuit. When this occurs, the electromagnet is again de-energized to allow downward movement of armature 34 to its lowermost position shown in Fig. 2, the freeing of projecting arm 36 for counterclockwise movement about pin 27, collapse of the toggle mechanism and finally disengagement of the contacts and opening of the door to the position shown by the broken lines in Fig. 4.

Upon the occurrence of the several operations by circuit opening device 88 hereinbefore described, similar operations have simultaneously occurred in circuit opening device 87 with the exception of the release of the blocking means 62 therein out of the path of the armature travel. This latter operation has been prevented since the relationship of notch 71 in device 87 to the V-shaped projection on the end of latch 65 when disc 95 is in the normal at rest position or the travel of armature 34 prior to release of the blocking means 62 is such that device 87 is responsive to a greater number of fault impulses and interruptions than is instrument 88 before its blocking means will be released. Therefore, upon the occurrence of the interruption of the circuit by recloser 86 which permitted disengagement of the contacts in device 88, the contacts in device 87 will be held in engagement by latch 35.

Thus, the fault X and branch main 84 will be isolated by device 88 during the momentary period recloser 86 is open subsequent to this interruption, and service will be restored through device 87 on the remainder of the system following the next reclosing of recloser 86. Thereupon, armature 34 in device 87, which is not responsive to normal current through magnet 31, will drop so that lever 73 will be effective to disengage pawl 72 from the ratchet teeth and flywheel 60 will return to its normal at rest position, thereby engaging pin 79 to effectively disengage pawl 76 from the ratchet teeth whereupon notching disc 95 will be free to automatically reset itself by turning clockwise under its spring bias to the normal at rest position shown in Fig. 2.

Following the removal of fault X in the main branch, the linesman need replace no parts in the device 88. All that is necessary to renew service to the main branch is to re-engage latch 35 with latch or projecting arm 36 and pivoting door 19 and its associated parts about pin 27 to the closed position. If it has not already done so, the flywheel 60 will then return to its normal at rest position and in so doing will first engage the rounded end of arm 64 on block 62 and then a rounded portion adjacent the hooked-shaped end of latch 65 to effect both the automatic return of stop or block 62 to its blocking position and the latching thereof, as illustrated in Fig. 2.

In addition to the engagement of latch 35 with arm 36, the contacts are held in engagement and the door 19 is maintained closed, during normal circuit conditions, by the engagement of the contact cap 30 with the pair of latching fingers 18.

The block releasing elements in the circuit opening devices 89 in sub-branches 85 are so related that these devices are responsive to a lesser number of interruptions before conditioning for opening than the device 88 in main branch 84. It will, therefore, be apparent that in the event of a fault above a predetermined value on one of these sub-branches, the contacts in circuit opening device 89 therein will be conditioned for disengagement before the blocking means in device 88 has been unlatched and will finally become disengaged upon a subsequent interruption by recloser 86, so that this particular sub-branch will be disconnected or isolated from the system while normal service will be resumed on the balance of the main branch through device 88 in which the contacts will not have become disengaged.

Thus, I have provided a new and improved circuit opening device embodying a flexible, simple and, therefore, relatively cheap counting and time delay means for coordination with prior art reclosers or multi-shot fuse cutouts to isolate faults to the smallest portion of a power distribution system.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. A circuit opening device comprising a pair of cooperating contacts, means biasing one of said contacts out of engagement with the other contact, releasable holding means including a latch to hold said contacts in engagement against the bias of said biasing means, an electromagnet having a winding connected in series with said contacts, an armature for said electromagnet operative to the attracted position in response to a current impulse through said contacts exceeding a predetermined value, means for releasing said latch when said armature is moved to an extreme attracted position away from its normal at rest position by said electromagnet and for thereafter holding said contacts in engagement, releasable blocking means for blocking the movement of said armature to said extreme position, a counting means movable from a normal at rest position in response to successive current impulses above said predetermined value and automatically resettable thereto, a flywheel movable from a normal at rest position in response to said current above a predetermined value to a position to cause delay of the automatic resetting of said counting means and rotatably movable to said normal at rest position in response to current through said contacts below a predetermined value to effect automatic resetting of said counting means, and means to release said blocking means during a predetermined movement of said counting means.

2. A circuit opening device comprising a pair of cooperating contacts, means biasing one of said contacts out of engagement with the other contact, releasable holding means including a latch to hold said contacts in engagement against the bias of said biasing means, an electromagnet having a winding connected in series relationship with said contacts, an armature for said electromagnet operative to the attracted position in response to a current impulse through said contacts exceeding a predetermined value, means for releasing said latch and thereafter holding said contacts in engagement when said armature is moved to an extreme attracted position by said electromagnet, a pivoted stop rotatably movable in the path of movement of said armature to block the movement thereof to said extreme attracted position, said stop normally biased away from said path, a circular rotatable disk the circular periphery of which contains ratchet teeth in a portion thereof and a relatively deep notch, the balance of said periphery having a smooth configuration, said disk biased to a normal at rest position, a pivoted stop holding and releasing latch biased into engagement with the periphery of said rotatable disk so that when in engagement with the smooth portion thereof said latch will be effective to hold said stop in the armature path to a blocking position and when in engagement with said relatively deep notch said latch will be effective to release said block for rotation out of said armature path, a notching pawl engageable with said ratchet teeth and movable by said armature in response to successive current impulses through said contacts above said predetermined value to rotatably advance said disk in a step-by-step manner from its normal at rest position and said relatively deep notch therein for engagement with said stop holding and releasing latch during a predetermined one of said successive impulses, a disk holding and rest pawl engageable with said ratchet teeth and spring biased to maintain said disk as advanced between said successive current impulses, a time delay means comprising a flywheel movable by said armature in response to said current above a predetermined value from a normal at rest position, said reset pawl normally held out of engagement with said ratchet teeth by said flywheel when in said normal at rest position, said flywheel mounted for relatively slow rotatable return on a stationary screw to said at rest position when the current through said contacts drops below a predetermined value to effect disengagement of said disk reset pawl from said ratchet teeth and return of said disk to its normal at rest position.

3. A circuit opening device comprising a pair of cooperating contacts, means biasing one of said contacts out of engagement with the other contact, releasable holding means including a latch to hold said contacts in engagement against the bias of said biasing means, releasable blocking means to block release of said latch, a ratchet mechanism for releasing said blocking means, means responsive to successive current impulses through said contacts above a predetermined value to move said ratchet mechanism in a step-by-step manner from an initial normal set position to an advanced position to effect release of said blocking means and said latch during a predetermined one of said successive impulses and a time delay means comprising a flywheel movable from a normal set position to delay return of said mechanism to its initial set position between said successive current impulses until said flywheel returns to its normal set position.

GEORGE F. LINCKS.

REFERENCES CITED

The following references are of record in the file of this patent:

UNITED STATES PATENTS

| Number | Name | Date |
|---|---|---|
| 1,982,986 | Garlington | Dec. 4, 1934 |
| 2,253,400 | Shoemaker | Aug. 19, 1941 |
| 2,387,372 | Watkins | Oct. 23, 1945 |
| 2,387,373 | Watkins et al. | Oct. 23, 1945 |
| 2,452,233 | Gerard et al. | Oct. 26, 1948 |